United States Patent
Aswani et al.

(10) Patent No.: US 8,264,207 B2
(45) Date of Patent: Sep. 11, 2012

(54) METHOD AND SYSTEM FOR PULSE CHARGING AN AUTOMOTIVE BATTERY

(75) Inventors: Deepak Aswani, Westland, MI (US); Robert K. Taenaka, Plymouth, MI (US); Stephen J. Hunter, Dearborn, MI (US); Mukunda V. Prema, Houston, TX (US); Syed Ali, Romeoville, IL (US); Shailesh Patel, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1251 days.

(21) Appl. No.: 11/873,068

(22) Filed: Oct. 16, 2007

(65) Prior Publication Data
US 2009/0096423 A1 Apr. 16, 2009

(51) Int. Cl.
H02J 7/04 (2006.01)
(52) U.S. Cl. ......... 320/139; 320/104; 320/141; 320/142
(58) Field of Classification Search .................... 320/139
See application file for complete search history.

(56) References Cited

U.S. PATENT DOCUMENTS

| | | | |
|---|---|---|---|
| 3,617,851 A | 11/1971 | Du Puy | |
| 4,331,911 A | 5/1982 | Park | |
| 5,726,551 A | 3/1998 | Miyazaki et al. | |
| 5,764,027 A | 6/1998 | Harvey | |
| 5,814,970 A | 9/1998 | Schmidt | |
| 5,821,729 A | 10/1998 | Schmidt et al. | |
| 5,905,360 A | 5/1999 | Ukita | |
| 5,990,662 A | 11/1999 | Yang | |
| 5,994,872 A * | 11/1999 | Hall | 320/104 |
| 6,150,795 A | 11/2000 | Kutkut et al. | |
| 6,275,004 B1 | 8/2001 | Tamai et al. | |
| 6,518,732 B2 | 2/2003 | Palanisamy | |
| 6,538,414 B1 | 3/2003 | Tsuruga et al. | |
| 6,580,977 B2 | 6/2003 | Ding et al. | |
| 2004/0135544 A1 | 7/2004 | King et al. | |
| 2006/0098390 A1 | 5/2006 | Ashtiani et al. | |
| 2007/0139011 A1 * | 6/2007 | Lin | 320/128 |
| 2008/0100265 A1 * | 5/2008 | Lim et al. | 320/134 |

OTHER PUBLICATIONS

C.C. Chan et al., A Microprocessor Based Intelligent Battery Charger for Electric Vehicle Lead Acid Batteries, Electric Vehicle Symposium, EVS-10, 1990, pp. 456-466, Hong Kong.
Philip T. Krein et al., Life Extension Through Charge Equalization of Lead-Acid Batteries, INTELEC 2002 Paper 32.1, pp. 516-523, University of Illinois, Urbana, IL, USA.
Nasser H. Kutkut et al., Dynamic Equalization Techniques for Series Battery Stacks, Soft Switching Technologies Corporation, 1996 IEEE, pp. 514-521, Middleton, Wisconsin, USA.
Thomas Stuart et al., A Modular Battery Management System for HEVs, SAE Paper 2002-01-1918, 2002, 9 pgs.

* cited by examiner

*Primary Examiner* — Edward Tso
*Assistant Examiner* — Johali Torres Ruiz
(74) *Attorney, Agent, or Firm* — David B. Kelley; Brooks Kushman P.C.

(57) ABSTRACT

A pulse charging profile for a vehicle battery is synchronized with driver or vehicle demanded current disturbances by phase tracking the fundamental frequency of the desired pulse charging profile to those driver or vehicle demanded current disturbances. When these driver or vehicle demanded disturbances are not active, the tracked charging profile is honored.

17 Claims, 6 Drawing Sheets

METHOD AND SYSTEM FOR PULSE CHARGING AN AUTOMOTIVE BATTERY

BACKGROUND

1. Field of the Invention

The invention relates to methods and systems for pulse charging automotive batteries.

2. Discussion

Battery cells in Hybrid Electric Vehicles (HEVs) may be electrically connected in series to provide high voltage. Over time, the state of charge (SOC) of individual cells may drift apart due to variations in intrinsic properties and environmental heat transfer. This may lead to reduced battery performance and life. As a result, it may be advantageous to rebalance the SOC of the cells.

Several methods may be used to rebalance the state of charge of battery cells. For example, some strategies individually adjust the state of charge of each cell through dedicated hardware. Such dedicated hardware, however, may not be practical in HEV applications due to cost and packaging constraints. Other strategies charge the cells until the lower SOC cells equalize, within some threshold, with respect to the higher SOC cells. Although these strategies may not require dedicated hardware, they may adversely affect cell life as the cells with higher SOC may become over-charged. Still other strategies begin charging the cells at a high current and gradually ramp to a small or "trickle" current as higher SOC cells approach 100%. These strategies may, however, be time consuming and subject to charge efficiency reductions at low currents where cell temperatures are approximately equal to ambient temperatures.

SUMMARY

Embodiments of the invention may take the form of a method for pulse charging a battery having a target pulse charge profile. The method includes determining an adapted phase of the target pulse charge profile based on recent battery usage and initiating pulse charging of the battery at the determined adapted phase.

Embodiments of the invention may take the form of a system including at least one controller configured to perform the method described above.

DETAILED DESCRIPTION

A multi-step charging profile may be used to rebalance battery cells. For example, high rate charging may be used to bring higher SOC cells to approximately 100% followed by pulse charging. This pulse charging may warm the cells and build pressure during pulse on and allow the cells to cool and decrease in pressure during pulse off. A rebalance charging profile, however, may be subject to vehicle control disturbances during vehicle operation. As a result, there may be a tradeoff between the effectiveness of any rebalance procedure and the drivability and fuel economy of the vehicle.

A power system may gradually ramp up a target SOC for a battery pack, while allowing for short term high charge and discharge cycles. Such cycles are common to hybrid electric vehicle operation during, for example, deceleration and acceleration events. When high SOC cells are approximately 100%, however, it may be desirable to maintain a desired charge versus time profile to increase cell life and performance. It may also be desirable to maintain drivability and fuel economy for the vehicle. As a result, vehicle and/or driver battery current requests often over-ride pulse charging requests.

When a pulse charging is re-initiated following a driver demand intervention, a charge/discharge profile may be out of synchronization. This may result in an incomplete pulse charging or a lengthening of time for pulse charging. This lengthening of time may decrease fuel economy and permit engine NVH to become more apparent.

Some embodiments of the invention synchronize and adjust a pulse charging profile with vehicle and/or driver requested current disturbances. This allows, for example, charge and relax periods that are similar to any optimal rate. Certain embodiments of the invention implement this synchronization by phase tracking the fundamental frequency of the desired pulse charging profile to driver demand current disturbances.

Figure 1:
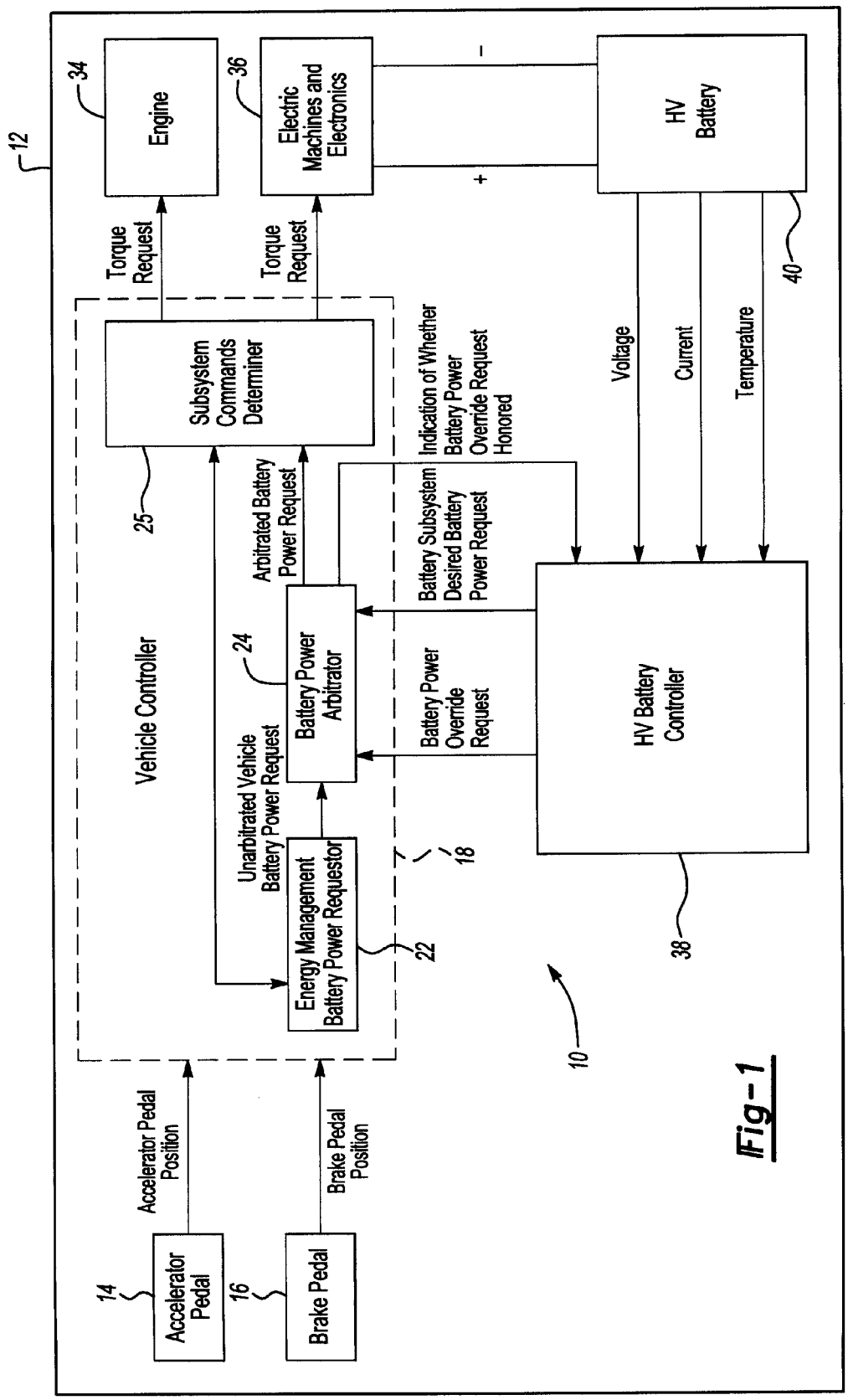
FIG. 1 is a block diagram of an example motive power system for an alternatively powered vehicle.

FIG. 1 is a block diagram of motive power system 10 for hybrid electric vehicle 12. Accelerator pedal position and brake pedal position from accelerator pedal 14 and brake pedal 16 respectively are read by vehicle controller 18. Vehicle controller 18 of FIG. 1 is implemented as several components, e.g., energy management battery power requester 22, battery power arbitrator 24, subsystem commands determiner 25. In other embodiments, vehicle controller 18 may be implemented as one or more controllers collectively configured to employ the methods described herein.

Figure 2:
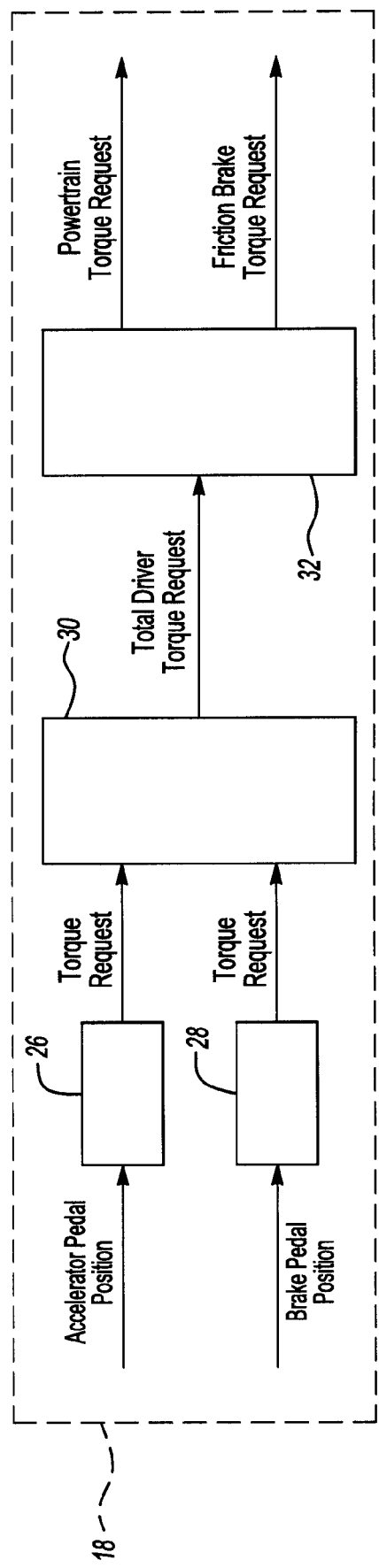
FIG. 2 is a block diagram of the controller of FIG. 1.

FIG. 2 is a block diagram of vehicle controller 18. Control blocks 26, 28 convert accelerator pedal position and brake pedal position, respectively, into torque requests. Control block 30 sums these torque requests to yield the total driver torque request. Control block 32 determines the powertrain torque request and friction brake torque request based on, for example, the total driver torque request, system limitations, and energy management objectives.

Referring to FIG. 1, energy management battery power requester 22 reads the powertrain torque request (FIG. 2) and outputs the unarbitrated vehicle battery power request based on, for example, emissions and efficiency criteria. Battery power arbitrator 24 reads the unarbitrated vehicle battery power request, the battery subsystem desired battery power request, and the battery power override request, if any, and outputs the arbitrated battery power request. Subsystem command determiner 25 reads the arbitrated battery power request and the powertrain torque request and outputs respective torque requests to engine 34 and electric machines and electronics 36.

High voltage battery controller 38 reads, for example, the voltage, current, and temperature of high voltage battery 40 and the indication of whether the battery power override request is honored and outputs the battery subsystem desired battery power request and the battery power override request, e.g., a flag.

If high voltage battery 38 issues a battery power override request, battery power arbitrator 24 may honor that request if, for example, the total driver torque request may still be met. For example, if the battery subsystem desired battery power request is −20 kW, engine 12 is capable of supplying 100 kW, and the total driver torque request is 50 kW, battery power arbitrator 24 may honor a battery power override request. If the battery subsystem desired battery power request is −30 kW, engine 12 is capable of supplying 70 kW, and the total driver torque request is 60 kW, battery power arbitrator 24 may not honor a battery power override request. High voltage battery 38 may issue a battery power override request if, for example, the state of charge of high voltage battery 38 exceeds a threshold, e.g., 90%, and high voltage battery 38 desires pulse charging.

Figure 3:
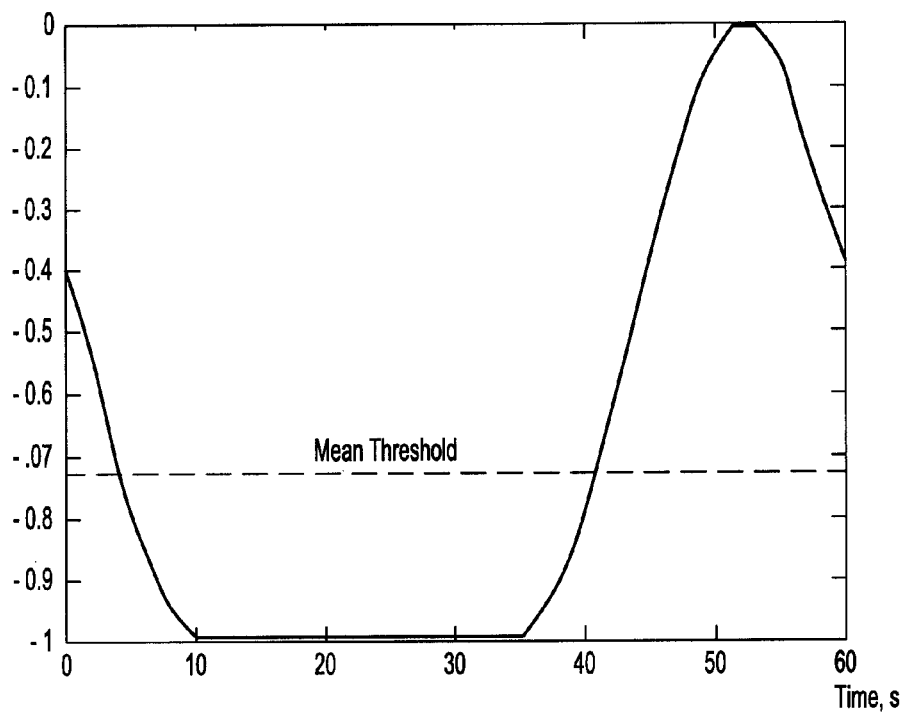
FIG. 3 is an example plot of a pulse charge wave form.

An example pulse charge wave form may have a 75% duty cycle for a period of 1 minute at about 13 amps and 13 cycles. FIG. 3 is an example plot of a single period of such a pulse charge wave form with some slew rate limiting and smoothing. The algorithms described herein, however, may be applied to any arbitrary periodic waveform.

Figure 4A:
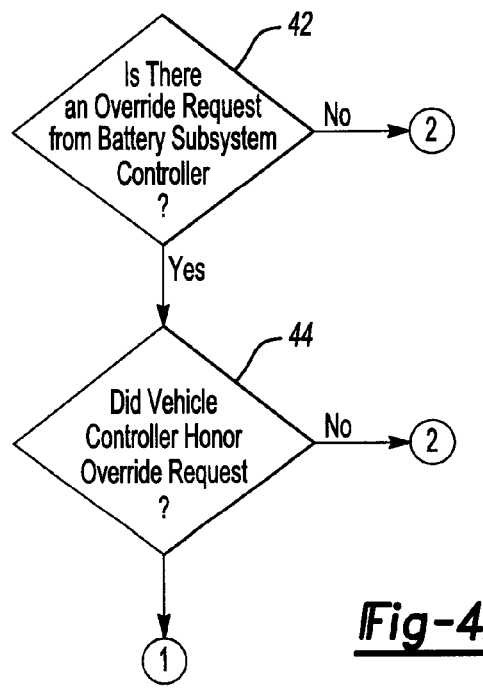
FIGS. 4A-4C are flow charts of a method for maintaining the battery of the alternatively powered vehicle of FIG. 1.
Figure 4B:
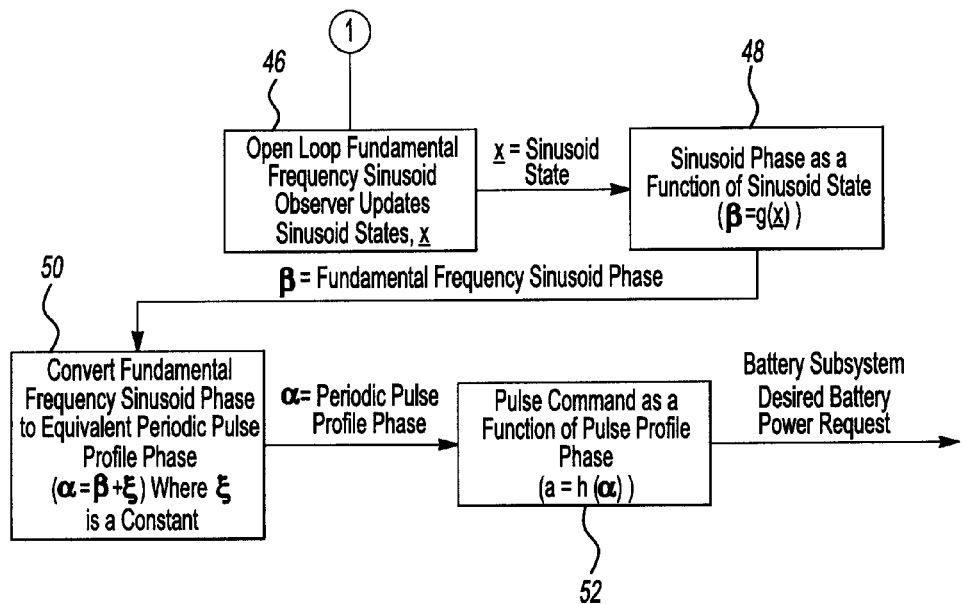
Figure 4C:
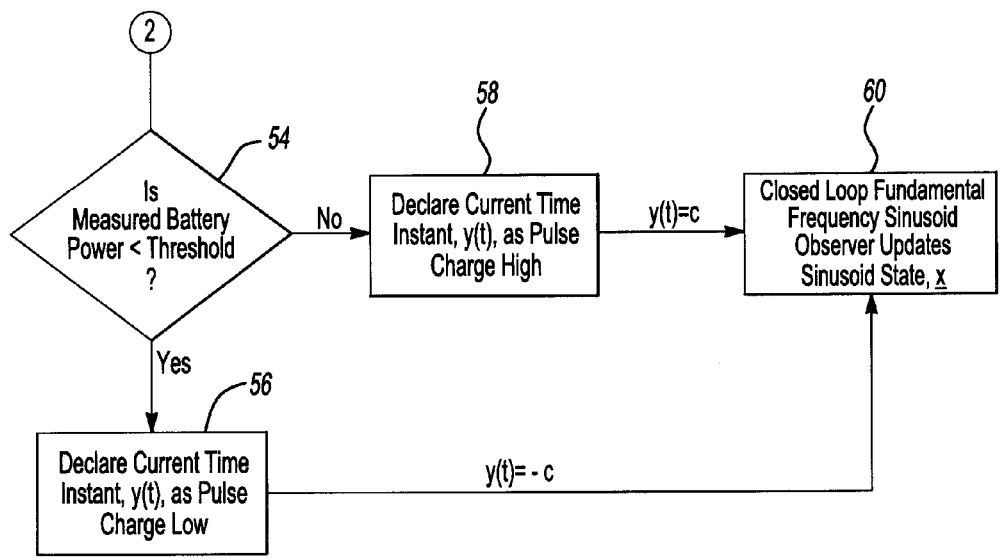

FIGS. 4A-4C are flow charts of a method for maintaining high voltage battery 40. At 42, it is determined whether there is an override request from the battery subsystem controller. If yes, at 44, it is determined whether the vehicle controller honored the override request. If yes, at 46 the open loop fundamental frequency sinusoid observer updates the sinusoid state, x, e.g., a sinusoid magnitude and slope. At 48, the sinusoid phase is determined as a function of the sinusoid state. At 50, the fundamental frequency sinusoid phase is converted to the equivalent periodic pulse profile phase by the addition of an offset. At 52, the pulse command is determined based on the pulse profile phase, yielding the battery subsystem desired battery power request.

The method proceeds to 54 if the outcome of 42 or 44 is no. At 54, it is determined whether a measure of battery power is less than a threshold. If yes, at 56, the current time instant is declared as a pulse charge low. If no, at 58, the current time instant is declared as a pulse charge high. At 60, the closed loop fundamental frequency sinusoid observer updates the sinusoid state, x. In the embodiment of FIGS. 4A-4C, the threshold is the mean of the desired pulse charge profile of FIG. 3. In other embodiments, the threshold may, for example, be a predetermined constant or other desired value.

Figure 5:
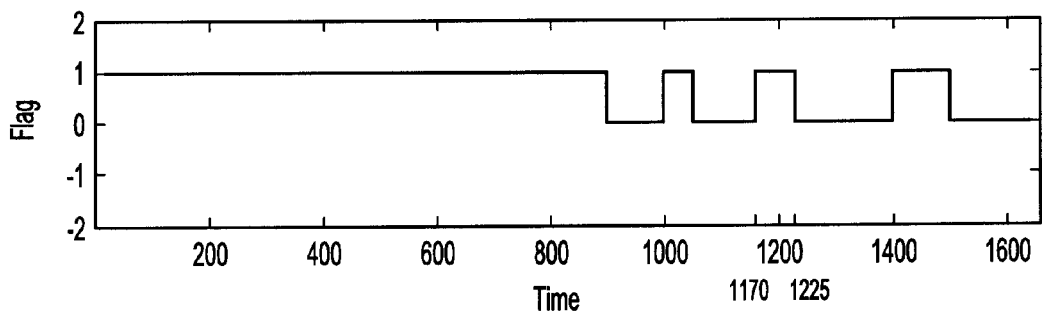
FIG. 5 is an example plot of the outcome of FIG. 4A.

FIG. 5 is an example plot of the outcome of FIG. 4A. A value of one (1) indicates that path 2 is active from FIG. 4C. A value of zero (0) indicates that path 1 is active from FIG. 4B. Battery power arbitrator 24 ignores the battery subsystem desired battery power request in the absence of a battery power override request. Battery power arbitrator 24 may honor the battery subsystem desired battery power request in the presence of a battery power override request. The absence of a battery power override request may be indicative of a non-maintenance phase of operation of high voltage battery 40. The presence of a battery power override request may be indicative of a maintenance phase of operation of high voltage battery 40.

Figure 6:
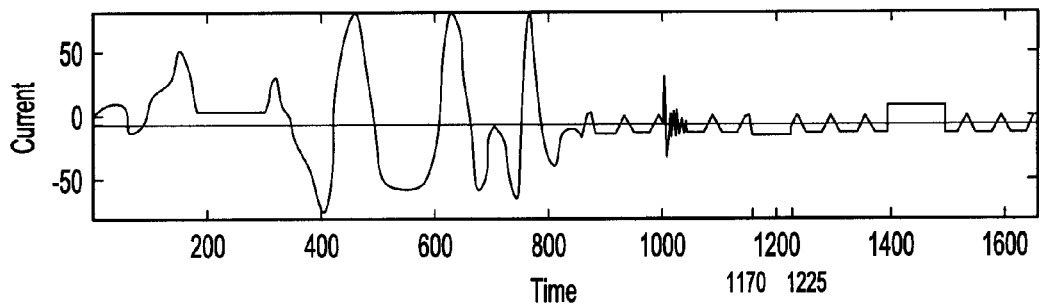
FIG. 6 is an example plot of the battery current of FIG. 1 versus time.

FIG. 6 is an example plot of battery current versus time. Portions of the plot above zero represent current being pulled from the battery, e.g., discharging. Portions of the plot below zero represent current being pushed to the battery, e.g., charging.

Figure 7:
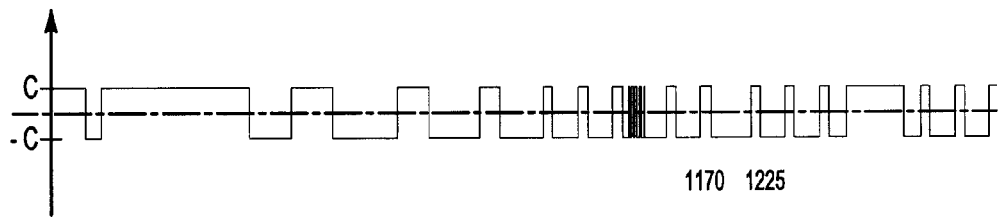
FIG. 7 is an example plot of the output of certain steps of the method of FIGS. 4A-4C based on the battery current of FIG. 6.

FIG. 7 is an example plot of the output of steps 56, 58 of FIG. 4C based on the battery current of FIG. 6. If the battery current is above the threshold, the plot is high, e.g., c. If the battery current is below the threshold, the plot is low, e.g., −c.

Figure 8:
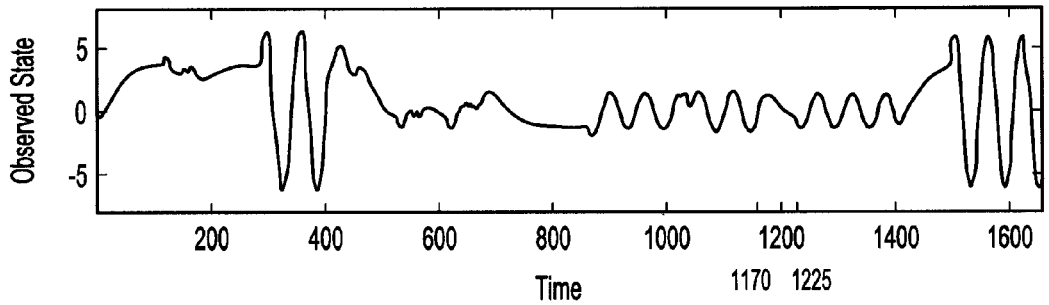
FIG. 8 is an example plot of the output of the methods of FIGS. 4A-4C based on the example plots of FIGS. 5-7.

FIG. 8 is an example plot of the observed fundamental frequency sinusoid output associated with the method of FIGS. 4A-4C that results from steps 46 and 60 depending on path as indicated by FIG. 4A and FIG. 5.

Referring to FIG. 5, the battery power override request is absent or not honored between 1170 seconds and 1225 seconds. As such, battery power arbitrator 24 ignores the battery subsystem desired battery power request and honors the unarbitrated vehicle battery power request during this time period. In this example, the unarbitrated vehicle battery power request results in a substantially steady current low during this time period as shown by FIG. 6. The methods of FIG. 4C are thus applicable during this time period: y(t) is set equal to −c as shown in FIG. 7 and the corresponding observed state of the fundamental sinusoid is updated as shown in FIG. 8. At time 1225 seconds, a battery power override request is issued. In this example, during the time between 1225 seconds and 1400 seconds, battery power arbitrator 24 honors the battery subsystem desired battery power request. The methods of FIG. 4B are thus applicable during this time period: at about 1225 seconds, high voltage battery controller 38 reads the current observed state, e.g., height and slope, of the fundamental sinusoid of FIG. 8 and determines the fundamental sinusoid phase as a function of the fundamental sinusoid observed state. High voltage battery controller 38 then converts the fundamental sinusoid phase to the equivalent pulse charge profile phase and determines the pulse command as a function of the pulse charge profile phase.

1. Pulse Fundamental Frequency Sinusoid Dynamic Model and Observer

A dynamic model that results in a single sinusoid requires two purely imaginary eigenvalues of opposite values. This can be modeled as $\hat{y}$ in a linear system as follows:

$$\dot{\hat{x}} = A\hat{x} \qquad (1)$$
$$\hat{y} = C\hat{x}$$

for which $$A = \begin{bmatrix} 0 & \omega \\ -\omega & 0 \end{bmatrix} \qquad (2)$$

and $$C = [0\ 1] \qquad (3)$$

where ω=2π/60 which is the fundamental frequency of the 60 second pulse cycle. For the system of (1), a state observer can be constructed based on real observation y as $$\dot{\hat{x}} = (A - LC)\hat{x} + y \qquad (4)$$

It should be noted that y observed should have a steady state value of zero so that current bias is not used to estimate a sinusoid. This can be accomplished by subtracting observed current by a filtered value of current with a relatively large time constant. Alternative schemes are possible as well, as will be discussed below.

For the pulse portion of rebalance, the rebalance strategy dictates the requested battery current draw with interruption by driver demand when present. For these cases, where rebalance command is active, feedback is not possible and the model is run in open loop where it is allowed to oscillate without learning disturbances. Defining $\rho_{na}$ as a boolean flag parameter to denote "pulse not active" as a state or that path 2 from FIG. 4C is active when battery power override requested is not present or battery power override request is not honored. This is a case where pulse charging is not desired or driver demand interference is present, and thus allows for such a transition into and out of open loop operation as shown in (5).

$$\dot{\hat{x}} = (A - \rho_{na}LC)\hat{x} + \rho_{na}y \quad (5)$$

2. Translating Modeled Sinusoid States to the Fundamental Frequency Sinusoid Phase The fundamental frequency sinusoidal component of the desired pulse charge profile, pulse (t) can be described as:

$$pulse_1(t) = \alpha \cos\left(\frac{2\pi}{60}t + \beta\right) \quad (6)$$

For the pulse charge profile of FIG. 3, $\alpha=0.4499$ and $\beta=3.9274$. Both $\alpha$ and $\beta$ can be computed using the Fourier series expansion for the ideal period pulse charge profile, for the fundamental frequency component of the form (6). For simplicity, define $$\phi = \frac{2\pi}{60}t + \beta.$$

If $\phi$ is known for the observed sinusoid expressed in cos form, the corresponding time value or t can be computed which can be used to determine an appropriate value from the desired pulse charge profile.

The observed states for the system of (5) do not qualify as a sinusoid of fixed gain or frequency. Without feedback, however, a sinusoid with frequency $\omega$ is guaranteed at some particular magnitude as learned during the prior feedback. By explicitly solving the system of (1) for $\hat{x}=[\hat{x}_1\hat{x}_2]$, it is seen that the solutions for $\hat{x}_1$ and $\hat{x}_2$ are both sinusoids of the same magnitude and off in phase by $\pi/2$. Therefore, $\hat{x}_1$ and $\hat{x}_2$ can be expressed as:

$$\hat{x}_1 = \alpha_o \sin(\phi_o)$$

$$\hat{x}_2 = \alpha_o \sin(\phi_o) \quad (7)$$

According to (7), $$\phi_o = \cos^{-1}\left(\frac{\hat{x}_2}{\alpha_o}\right) \quad (8)$$

Substituting the Pythagorean trigonometric identity with the definitions in (7), $$\alpha_o = \sqrt{\hat{x}_1^2 + \hat{x}_2^2} \quad (9)$$

Therefore $$\phi_o = \cos^{-1}\left(\frac{\hat{x}_2}{\sqrt{\hat{x}_1^2 + \hat{x}_2^2}}\right) \quad (10)$$

In open loop operation of (5), $\emptyset_o$ should be monotonically increasing in a sawtooth fashion over the range of $[0,2\pi]$. This property is used to adjust $\emptyset_o$ to a range of $[0,2\pi]$ as follows:

$$\phi_o = 2\pi - \cos^{-1}\left(\frac{\hat{x}_2}{\sqrt{\hat{x}_1^2 + \hat{x}_2^2}}\right), \quad \frac{d}{dt}\cos^{-1}\left(\frac{\hat{x}_2}{\sqrt{\hat{x}_1^2 + \hat{x}_2^2}}\right) < 0 \quad (11)$$

$$\phi_o = \cos^{-1}\left(\frac{\hat{x}_2}{\sqrt{\hat{x}_1^2 + \hat{x}_2^2}}\right), \quad \frac{d}{dt}\cos^{-1}\left(\frac{\hat{x}_2}{\sqrt{\hat{x}_1^2 + \hat{x}_2^2}}\right) \geq 0$$

3. Converting Fundamental Frequency Sinusoid Phase into Desired Pulse Charge Phase (or Time)

Since $C=[0\ 1]$, the pulse charge phase (or time), t, is defined as a function of $\emptyset_o$, the fundamental frequency sinusoid phase, as described below $$t = \frac{60}{2\pi}(\phi_o - \beta) \quad (12)$$

4. Converting Desired Pulse Charge Phase (or Time) to Pulse Command

Based on the time, t, as determined above, the function pulse (t) that represents the ideal pulse charge profile as defined above, is used to return the pulse command.

Some additional steps may be required to implement a pulse tracker as described above. For example, the observer described above may easily learn biases or accumulate large states due to larger current swings. Therefore, in implementation, a non-linear transformation may be applied to current disturbances so that they are scaled between finite bounds of 0 and 1. This restricts the bounds of disturbances that are learned. In order to avoid learning bias disturbances, two steps may be taken: 1) A fixed bias of the mean value of the desired pulse profile (operated on by the identical non-linear transformation) is subtracted from the transformed disturbance; 2) For actual biases in disturbances, a timer with hysteresis in triggering is maintained to disable observer feedback to avoid learning faulty parameters. This technique may be preferred over subtracting a large time constant filtered value of the disturbance as discussed above because it requires less calibration effort and can respond more quickly and accurately.

Figure 9:
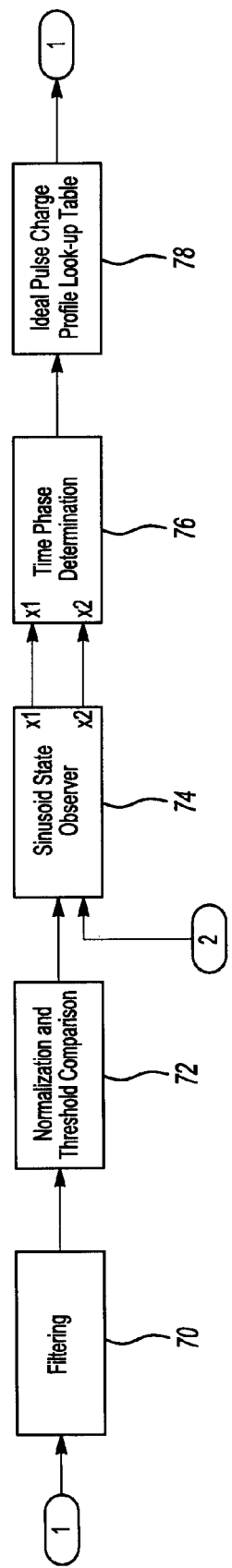
FIG. 9 is block diagram of an example implementation of a disturbance tracking algorithm via pulse charge battery power requests.

FIG. 9 is block diagram of an example implementation of a disturbance tracking algorithm. Blocks 70, 72 apply the non-linear transformation and subtract the bias from the measured current disturbances. Block 74 implements "Pulse Fundamental Frequency Sinusoid Dynamic Model and Observer" discussed above. Block 76 implements "Translating Modeled Sinusoid States to the Fundamental Frequency Sinusoid Phase" and "Converting Fundamental Frequency Sinusoid Phase into Desired Pulse Charge Phase (or Time)" discussed above. In "Converting Desired Pulse Charge Phase (or Time) to Pulse Command" the estimated time is used to generate a pulse value from lookup table 78 which is sent out.

Input signal 1 is the measured battery current, for example, as shown in FIG. 6. Input signal 2 is the outcome condition of FIG. 4A, for example, as shown in FIG. 5. Output signal 1 is the battery subsystem desired battery power request, for example, which can be seen in FIG. 6, when path 1 of FIG. 4a is selected, or in other words, when the signal of FIG. 5 is high.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for pulse charging a battery having a target pulse charge profile, the method comprising:
   determining an adapted phase of the target pulse charge profile based on recent battery usage including determining whether measured battery power is less than or greater than a predetermined threshold; and
   initiating pulse charging of the battery at the determined adapted phase.

2. The method of claim 1 wherein the battery has a non-maintenance state and wherein the step of determining an adapted phase of the target pulse charge profile based on recent battery usage is performed during the non-maintenance state.

3. The method of claim 2 wherein the battery has a maintenance state and wherein the step of initiating pulse charging of the battery at the determined adapted phase is performed during a transition from the non-maintenance state to the maintenance state.

4. The method of claim 1 further comprising determining whether a battery maintenance power override request is issued wherein the step of determining an adapted phase of the target pulse charge profile based on recent battery usage is performed if the battery maintenance power override request is not issued.

5. The method of claim 4 further comprising determining whether the battery maintenance power override request is honored wherein the step of determining an adapted phase of the target pulse charge profile based on recent battery usage is performed if the battery maintenance power override request is not honored.

6. The method of claim 5 wherein the step of initiating pulse charging of the battery at the determined adapted phase is performed if the battery maintenance power override request is issued and if the battery maintenance power override request is honored.

7. The method of claim 1 wherein the predetermined threshold is based on the target pulse charge profile.

8. The method of claim 1 wherein the predetermined threshold comprises a mean of the target pulse charge profile.

9. A system for pulse charging a battery having a target pulse charge profile, the system comprising:
   at least one controller configured to determine an adapted phase of the target pulse charge profile based on recent battery usage including determining whether measured battery power is less than or greater than a predetermined threshold and to initiate pulse charging of the battery at the determined adapted phase.

10. The system of claim 9 wherein the battery has a non-maintenance state and wherein the at least one controller determines an adapted phase of the target pulse charge profile based on recent battery usage during the non-maintenance state.

11. The system of claim 10 wherein the battery has a maintenance state and wherein the at least one controller initiates pulse charging of the battery at the determined adapted phase during a transition from the non-maintenance state to the maintenance state.

12. The system of claim 9 wherein the at least one controller is further configured to determine whether a battery maintenance power override request is issued and wherein the at least one controller determines an adapted phase of the target pulse charge profile based on recent battery usage if the battery maintenance power override request is not issued.

13. The system of claim 12 wherein the at least one controller is further configured to determine whether the battery maintenance power override request is honored and wherein the at least one controller determines an adapted phase of the target pulse charge profile based on recent battery usage if the battery maintenance power override request is not honored.

14. The system of claim 13 wherein the at least one controller initiates pulse charging of the battery at the determined adapted phase if the battery maintenance power override request is issued and if the battery maintenance power override request is honored.

15. The system of claim 9 wherein the predetermined threshold is based on the target pulse charge profile.

16. The system of claim 9 wherein the predetermined threshold comprises a mean of the target pulse charge profile.

17. A system for pulse charging a battery having a target pulse charge profile, the system comprising:
   at least one controller configured to initiate pulse charging of the battery at an adapted phase of the target pulse charge profile, the adapted phase being based on recent battery usage and whether measured battery power is less than or greater than a predetermined threshold.

* * * * *